(12) United States Patent
Kim et al.

(10) Patent No.: US 7,929,558 B2
(45) Date of Patent: Apr. 19, 2011

(54) METHOD FOR BUFFERING RECEIVE PACKET IN MEDIA ACCESS CONTROL FOR SENSOR NETWORK AND APPARATUS FOR CONTROLLING BUFFERING OF RECEIVE PACKET

(75) Inventors: Se-Han Kim, Daejon (KR); Yong-Sun Kim, Daejon (KR); Yoon-Mee Doh, Daejon (KR); Cheol-Sig Pyo, Daejon (KR)

(73) Assignee: Electronics and Telecommunications Research Institute, Daejon (DE)

( * ) Notice: Subject to any disclaimer, the term of this patent is extended or adjusted under 35 U.S.C. 154(b) by 917 days.

(21) Appl. No.: 11/605,925

(22) Filed: Nov. 29, 2006

(65) Prior Publication Data

US 2007/0133583 A1 Jun. 14, 2007

(30) Foreign Application Priority Data

Dec. 1, 2005 (KR) .................. 10-2005-0116160
Jun. 12, 2006 (KR) .................. 10-2006-0052555

(51) Int. Cl.
*H04L 12/56* (2006.01)
(52) U.S. Cl. ............... 370/412; 370/395.52; 370/428
(58) Field of Classification Search .................. 370/328
See application file for complete search history.

(56) References Cited

U.S. PATENT DOCUMENTS

| | | | | |
|---|---|---|---|---|
| 6,510,156 B1 * | 1/2003 | Brock et al. | ............... | 370/395.1 |
| 2004/0095939 A1 * | 5/2004 | Yang | ............... | 370/395.52 |
| 2004/0160950 A1 * | 8/2004 | Vallstrom et al. | ............... | 370/352 |
| 2004/0199276 A1 * | 10/2004 | Poon | ............... | 700/94 |
| 2005/0169290 A1 * | 8/2005 | Sumita | ............... | 370/412 |

FOREIGN PATENT DOCUMENTS

EP 0786919 7/1997

(Continued)

OTHER PUBLICATIONS

Morello, A., et al., "DVB-S2—Ready for Lift off." Oct. 2004. *EBU Technical Review*.

(Continued)

*Primary Examiner* — George Eng
*Assistant Examiner* — Jing (Kristen) Gao
(74) *Attorney, Agent, or Firm* — Ladas & Parry LLP

(57) ABSTRACT

Provided is a method for buffering a receive packet in a sensor node including a radio frequency (RF) transceiver, a media access control (MAC) hardware block and a micro controller unit (MCU). The method includes the steps of: a) if a packet is received from the RF transceiver, checking whether or not a packet which is pre-stored in a receive first in first out (FIFO) exists; b) if the pre-stored packet exists in the receive FIFO at step a), checking whether a length of the received packet is the same with the length of the pre-stored packet in the receive FIFO; c) if the length of the received packet is the same with the length of the pre-stored packet in the receive FIFO at the step b), increasing the number of packet which is included in header information, and buffering a physical payload in the receive FIFO; and d) if the pre-stored packet does not exist in the receive FIFO at the step a) nor the length of the received packet is the same with the length of the pre-stored packet in the receive FIFO, consecutively buffering the physical payload with the header in the receive FIFO.

5 Claims, 5 Drawing Sheets

FOREIGN PATENT DOCUMENTS

| | | | |
|---|---|---|---|
| KR | 10-0222222 | | 10/1999 |
| KR | 100222222 B | | 10/1999 |
| KR | 10-2000-0036514 | * | 1/2002 |
| KR | 1020020002074 | | 1/2002 |
| KR | 10-2004-0037331 | | 5/2004 |
| KR | 1020050064109 | | 6/2005 |
| KR | 1020060076418 | | 7/2006 |

OTHER PUBLICATIONS

Notice of Korean Patent Grant dated Nov. 29, 2007 for the corresponding application KR10-2006-0052555.

Notice of Preliminary Rejection issued from Korean Patent Office. Issued on May 31, 2007.

\* cited by examiner

METHOD FOR BUFFERING RECEIVE PACKET IN MEDIA ACCESS CONTROL FOR SENSOR NETWORK AND APPARATUS FOR CONTROLLING BUFFERING OF RECEIVE PACKET

FIELD OF THE INVENTION

The present invention relates to a method for buffering a receive packet in a media access control (MAC) for a sensor network and an apparatus for controlling the buffering of the receive packet; and, more particularly, to a method for buffering a receive packet in a MAC for a sensor network and an apparatus for controlling the buffering of the receive packet which increases an efficiency of a packet receive process by recoding a packet length and a number of packet on a header and consecutively buffering payloads of the packet if a MAC hardware receives a packet having the same packet length.

DESCRIPTION OF RELATED ARTS

Recently, a development for a ubiquitous sensor network (USN) is progressed diversely. The USN is composed of a wireless sensor network through a sensor node having a sensor which detects recognition information or environment information for an object. The USN transmits, processes and manages the information received through various sensors to an external system through a network in real time. Ultimately, the USN implements a communication environment irrespective of a time, a place, a network, and a device by allotting a communication function and a computing function to all objects.

FIG. 1 shows a block diagram of a general ubiquitous sensor network (USN). The USN includes a sensor node 11, a sensor field 1, a sink node 2, a management server, and a gateway 3. The sensor node 11 is composed of a sensor which detects a recognition information or environment information for an object in real time, and a communication module. The sensor field 2 is composed of a set of the sensor node 11.

The sink node 2 receives the information collected in the sensor field 1. The gateway 3 routes and transmits the received information from the sink node 2 to the management server 4 through a wideband communication network. The sink node 2 may be connected to a gateway 3 through an infrastructure, e.g., a satellite communication, a wireless LAN, and a wire Internet. A packet is relatively simple in a sensor field of a sensor network environment. That is, some sensors are installed in each sensor node 11 installed in one sensor field 1. And, a length of a data packet is limited within few sensors.

An IEEE 802.15.4 as a MAC protocol used in the sensor network includes a beacon frame, a data frame, an ACK frame, and a MAC command frame. The ACK frame has a fixed length, and the data frame has a fixed length relatively due to a limited sensor sort. The beacon frame and the MAC command frame have few sorts of packet lengths since a shape of the sensor field is fixed.

FIG. 2 shows a buffering state of a receive buffer in a general MAC hardware. A physical layer (PHY), a header (PHR) and a PSDU are buffered consecutively in a receive FIFO.

As shown in FIG. 2, if a MAC hardware receives a packet, one bite header and a PLCP service data unit (PSDU) are consecutively buffered to a receive buffer. The MAC hardware reads a packet length from the header, and reads the PDSU from the receive buffer as long as the read length.

However, a characteristic of the packet used in the sensor network has few sorts of lengths. Since a sensor node used in the sensor network uses a battery as a basic power, the sensor node is requested to be implemented at a low consumption, a small size and a low price.

SUMMARY OF THE INVENTION

It is, therefore, an object of the present invention to provide a method for buffering a receive packet in a MAC for a sensor network and an apparatus for controlling the buffering of the receive packet which increases an efficiency of a packet receive process by recoding a packet length and a number of packet on a header and consecutively buffering payloads of the packet if a MAC hardware receives a packet having the same packet length.

In accordance with an aspect of the present invention, there is provided a method for buffering a receive packet in a sensor node including a radio frequency (RF) transceiver, a media access control (MAC) hardware block and a micro controller unit (MCU), including the steps of: a) if a packet is received from the RF transceiver, checking whether or not a packet which is pre-stored in a receive first in first out (FIFO) exists; b) if the pre-stored packet exists in the receive FIFO at step a), checking whether a length of the received packet is the same with the length of the pre-stored packet in the receive FIFO; c) if the length of the received packet is the same with the length of the pre-stored packet in the receive FIFO at the step b), increasing the number of packet which is included in header information, and buffering a physical payload in the receive FIFO; and d) if the pre-stored packet does not exist in the receive FIFO at the step a) nor the length of the received packet is the same with the length of the pre-stored packet in the receive FIFO, consecutively buffering the physical payload with the header in the receive FIFO.

In accordance with another aspect of the present invention, there is provided an apparatus for controlling the buffering of receive packet in a sensor node including a radio frequency (RF) transceiver, a media access control (MAC) hardware block and a micro controller unit (MCU), including: a receive first in first out (FIFO) buffer for buffering a packet received from the RF transceiver; and a receive FIFO controller, if the length of the packet received from the RF transceiver is the same with the length of a pre-stored packet in the receive FIFO buffer, for increasing the number of packet included in header information which is stored in the receive FIFO buffer, and buffering a physical payload of the received packet in the receive FIFO.

BRIEF DESCRIPTION OF THE DRAWINGS

The above and other objects and features of the present invention will become better understood with regard to the following description of the preferred embodiments given in conjunction with the accompanying drawings, in which.

DETAILED DESCRIPTION OF THE INVENTION

Hereinafter, a method for buffering a receive packet in a MAC for a sensor network and an apparatus for controlling the buffering of the receive packet in accordance with a preferred embodiment of the present invention will be described in more detail with reference to the accompanying drawings.

Figure 1:
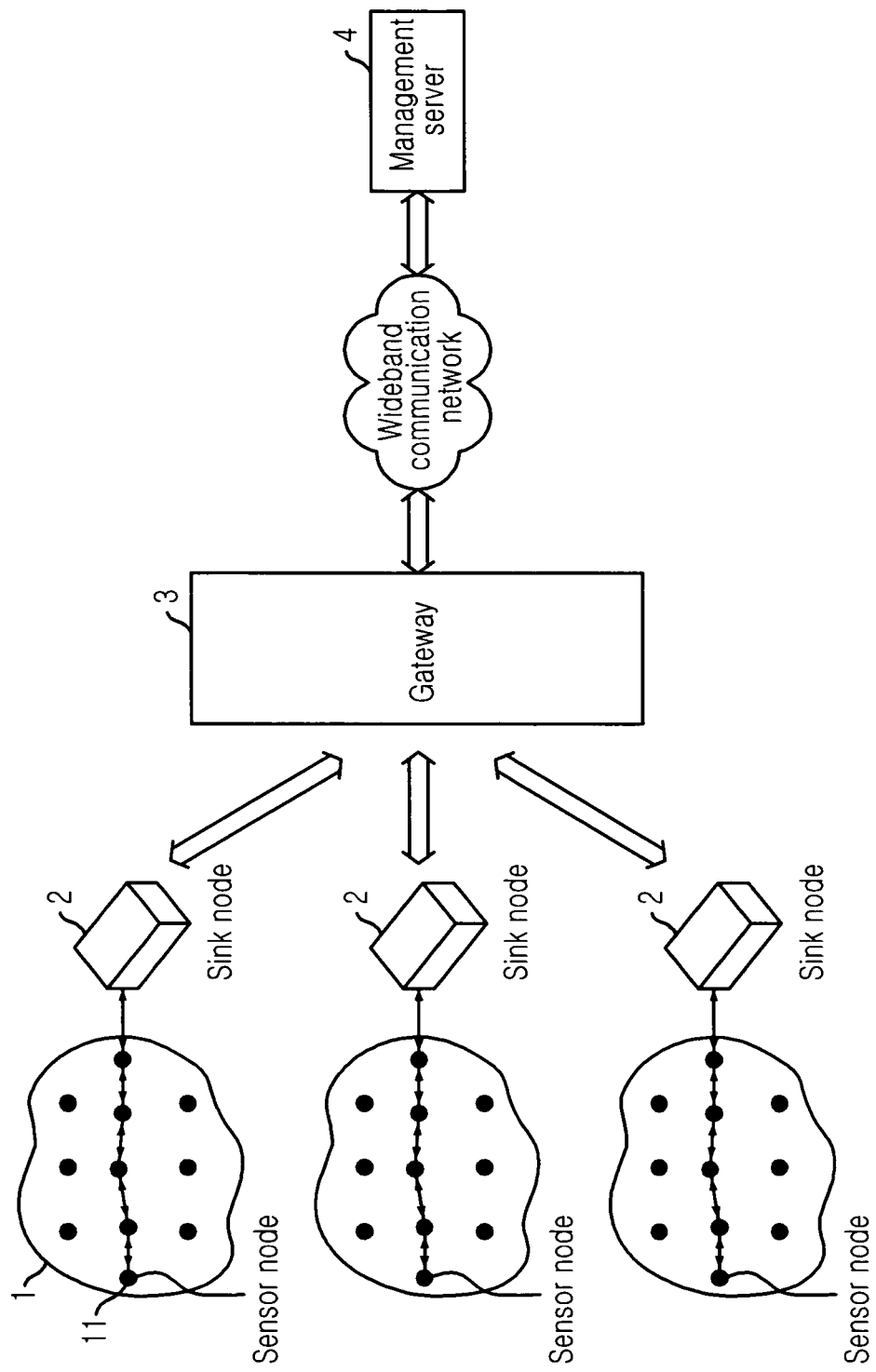
FIG. 1 shows a block diagram of a general ubiquitous sensor network.
Figure 2:
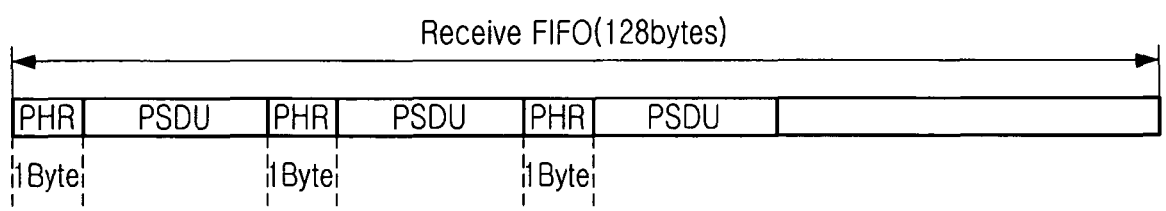
FIG. 2 shows a buffering state of a receive buffer in a general MAC hardware.
Figure 3:
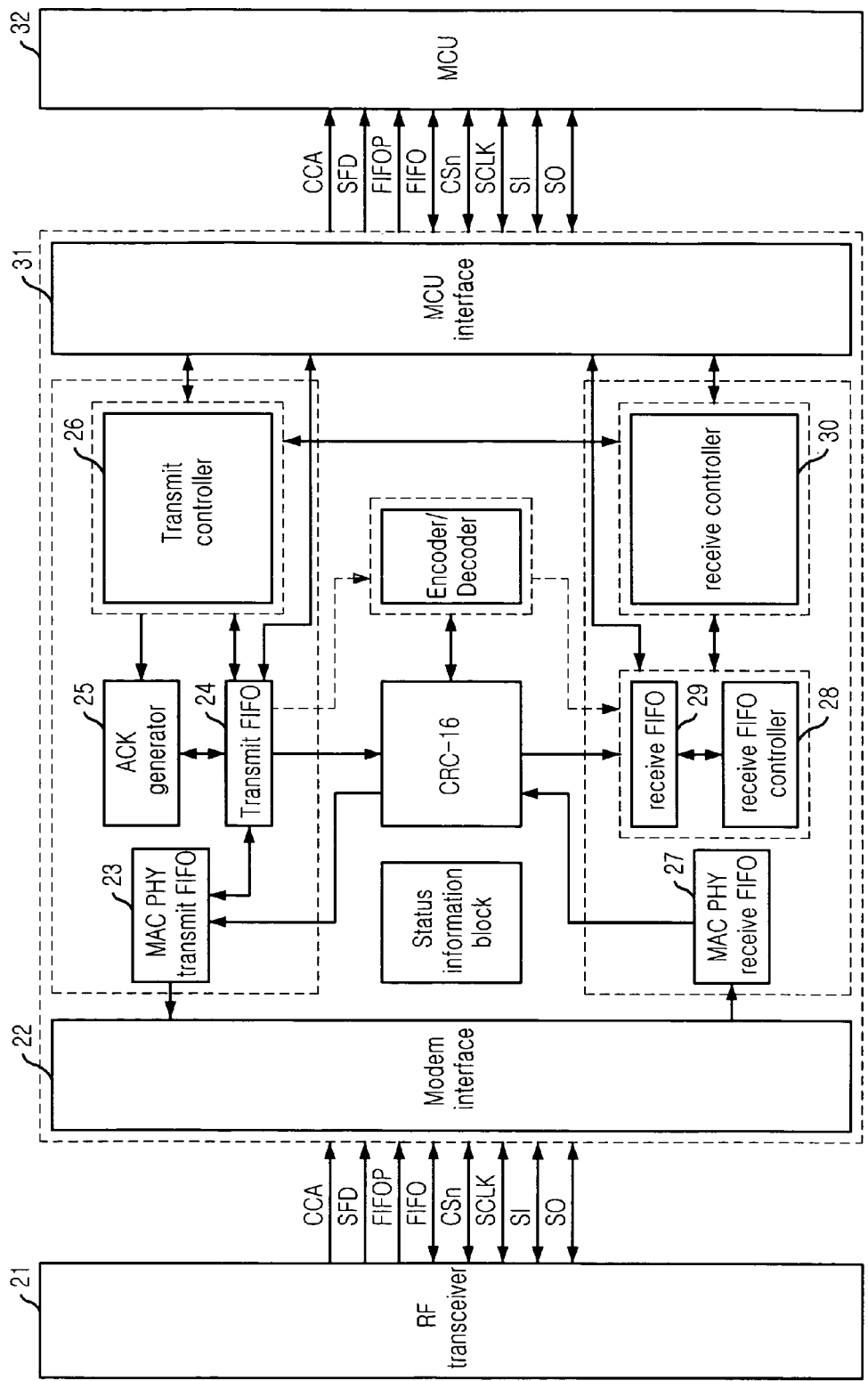
FIG. 3 shows a block diagram of a MAC hardware in a sensor node in accordance with an embodiment of the present invention.

FIG. 3 shows a detailed block diagram of a media access control (MAC) hardware of a sensor node in accordance with an embodiment of the present invention.

A sensor node includes a radio frequency (RF) transceiver 21, an MAC hardware and a micro controller unit (MCU) 32. The sensor node receives a packet through the RF transceiver 21 and an external antenna (not illustrated in FIG. 3) to the MAC hardware. The packet is processed in the MAC hardware, and is transmitted to the MCU 32.

The MAC hardware includes a modem interface 22, a MAC physical transmit first in first out (FIFO) 23, a transmit FIFO 24, an ACK generator 25, a transmit controller 26, a MAC physical receive FIFO 27, a receive FIFO controller 28, a receive FIFO 29, a receive controller 30 and an MCU interface 31.

The modem interface 22 interfaces with the RF transceiver 21. The MAC physical transmit FIFO 23 stores a packet temporarily before transmitting the packet through the modem interface 22 to the RF transceiver 21. The transmit FIFO 24 buffers the packet to be transmitted temporarily. The ACK generator 25 generates an acknowledgement (ACK) frame. The transmit controller 26 performs a process for the transmit packet inputted through the MCU interface 31. The MAC physical receive FIFO 27 stores and stabilizes a receive packet received through the modem interface 22. The receive FIFO controller 28 controls buffering of the receive FIFO 29. The receive FIFO 29 buffers the receive packet. The receive controller 30 controls a receive process of the packet. The MCU interface 31 is interfaced with the MCU 32.

In an IEEE 802.15.4, a packet includes a synchronization header, a physical header, and a physical payload. In other words, the physical payload may be called as a PLCP service data unit (PSDU). The synchronization header includes a preamble of four octets, and a start of frame delimiter (SFD) of one octet. The physical header has a data length of ten octets.

Moreover, a beacon frame, a data frame, an ACK frame and a command frame have the same packet structure in the IEEE 802.15.4.

A frame received to the MAC hardware through the RF transceiver 21 has a physical header and a physical payload except a synchronization header of five octets in a general packet structure.

Whole size of the transmit FIFO 24 and the receive FIFO 29 are the same with a maximum packet length of a packet which may be used in the IEEE 802.15.4. If the receive FIFO 29 receives a packet having a maximum length, the receive FIFO 29 buffers only one packet.

Figure 4:
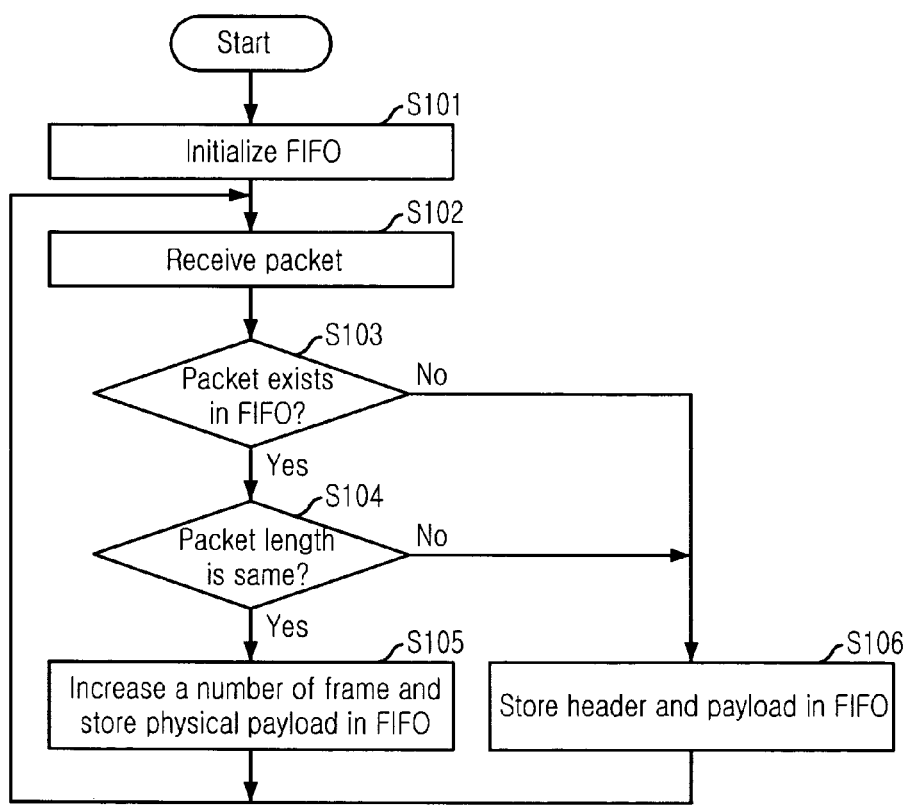
FIG. 4 shows a flow chart showing a method for buffering a receive packet in a MAC hardware in accordance with an embodiment of the present invention.

Referring to FIG. 4, a process for buffering the receive packet in the receive FIFO in accordance with an embodiment of the present invention is described as below.

If the receive FIFO 29 starts first or receives a reset command, an access point of the receive FIFO is set to a zero, and a butter is initialized at step S101.

Subsequently, if a packet is received from the RF transceiver 21 at step S102, the receive FIFO 29 stores the received packet. The receive FIFO controller 30 checks whether or not non-processed data exists in the receive FIFO 29 at step S103. If the non-processed data exists in the receive FIFO 29, the receive FIFO controller 30 checks that a length of the received packet from the RF transceiver 21 is the same with the length of the stored packet previously in the receive FIFO 29 at step S104.

If the length of the non-processed packet is the same with the length of the received packet, the number of NUM field is increased. A buffering state of a physical service data unit (PSDU) for a packet having the same length is indicated on a remain field in a header, and the PSDU is buffered in the receive FIFO 29 at step S105.

Meanwhile, the non-processed packet does not exist in the receive FIFO 29 or the new receive packet does not have the same length with the non-processed packet, the header and the physical payload are consecutively buffered in the receive FIFO 29 at step S106.

The receive controller 30 analyzes the packet stored in the receive FIFO 29 about a basic MAC header, and enables the MCU to read the stored packet by notifying the packet receive to the MCU 32.

In another embodiment of the present, the MCU 32 checks whether a packet is received in the receive FIFO 29 through a polling at a regular interval and reads the buffered packet in the receive FIFO 29.

Subsequently, a reading process for the buffered packet in the receive FIFO 29 is described as below.

The MCU 32 reads head information and checks a length of the packet and the remain field of one bit. If the remain field is set to "0", the MCU 32 reads the PSDU as long as the packet in a state that the header and the PSDU are buffered consecutively.

If the remain field is set to "1", since the PSDU is buffered about a packet having the same packet length, the MCU 32 reads the NUM field of one octet to thereby read the packet as much as the number of NUM field.

Figure 5:
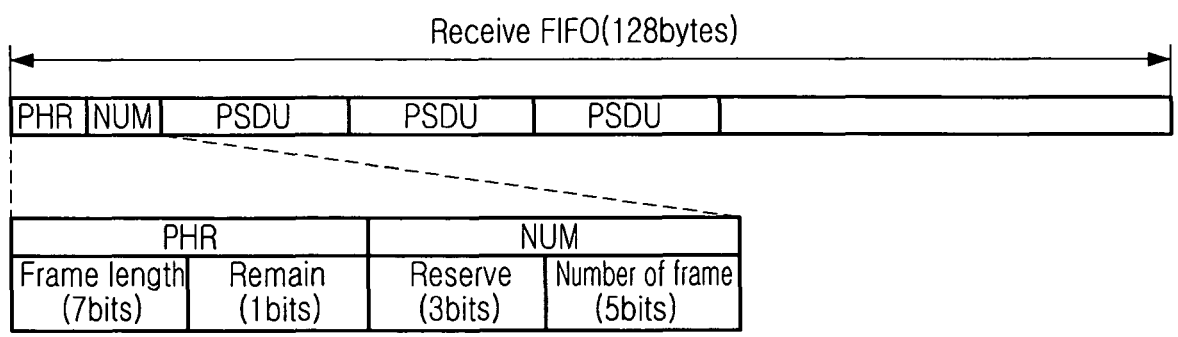
FIG. 5 shows a packet buffering state of a receive FIFO in accordance with an embodiment of the present invention.

FIG. 5 shows a packet buffering state of a receive FIFO in accordance with an embodiment of the present invention.

Since same kinds of packets which are used in the sensor network are probably received consecutively, as shown in FIG. 5, seven bits in the frame header (PHR) of one octet denote a frame length and the remain field of one bit is used to indicate whether the PDSU is stored in the receive FIFO 29 without a physical layer (PHY) and the PHR when frames each having the same length are received consecutively.

The NUM of one octet denotes a number of PSDU having the same length.

The method of the present invention as mentioned above may be implemented by a software program and stored in a computer-readable storage medium such as CD-ROM, RAM, ROM, floppy disk, hard disk, optical magnetic disk, etc. This process may be readily carried out by those skilled in the art; and therefore, details of thereof are omitted here.

The present application contains subject matter related to Korean patent application No. 2005-16160, filed in the Korean patent office on Dec. 1, 2005, and Korean patent application No. 2006-52555, field in the Korean patent office on Jun. 12, 2006, the entire contents of which being incorporated herein by reference.

While the present invention has been described with respect to certain preferred embodiments, it will be apparent to those skilled in the art that various changes and modifications may be made without departing from the spirits and scope of the invention as defined in the following claims.

What is claimed is:

1. A method for buffering a receive packet in a sensor node including a radio frequency (RF) transceiver, a media access control (MAC) hardware block and a micro controller unit (MCU), comprising the steps of:

a) receiving a packet from the RF transceiver and checking if a packet is pre-stored in a receive first in first out (FIFO);

b) if the pre-stored packet exists in the receive FIFO at step a), checking whether a length of the received packet is the same as the length of the pre-stored packet in the receive FIFO;

c) if the length of the received packet is the same as the length of the pre-stored packet in the receive FIFO at step b), increasing a number of packets that is included in header information of the pre-stored packet corresponding to buffered payloads, and buffering only a physical payload of the packet in the receive FIFO; and d) if the pre-stored packet does not exist in the receive FIFO at step a) or if the length of the received packet is not the same as the length of the pre-stored packet in the receive FIFO, consecutively buffering both the physical payload and the header of the received packet in the receive FIFO.

2. The method as recited in claim 1, further comprising the step of:

if the MCU analyzes the header information of the packet which is buffered in the receive FIFO, and state information is set representing the buffering of the physical payload in a packet having the same length, reading as many packets as the number of packet having the same length.

3. The method as recited in claim 2, wherein the header information includes packet length information of seven bits and the state information which represents the buffering of the physical payload in a packet having the same length of one bit.

4. An apparatus for controlling the buffering of receive packet in a sensor node including a radio frequency (RF) transceiver, a media access control (MAC) hardware block and a micro controller unit (MCU), comprising:

a receive first in first out (FIFO) buffer for buffering a packet received from the RF transceiver; and a receive FIFO controller, if a length of the packet received from the RF transceiver is the same as the length of a pre-stored packet in the receive FIFO buffer, for increasing the number of packets included in header information of the pre-stored packet that is stored in the receive FIFO buffer, and buffering only a physical payload of the received packet in the receive FIFO.

5. The apparatus as recited in claim 4, wherein the receive FIFO controller sets the state information which represents the buffering of the physical payload in a packet having the same length.

* * * * *